United States Patent
Jain (10) Patent No.: US 10,404,735 B2
(45) Date of Patent: Sep. 3, 2019

(54) INDIVIDUALIZED CYBERSECURITY RISK DETECTION USING MULTIPLE ATTRIBUTES

(71) Applicant: Aetna Inc., Hartford, CT (US)

(72) Inventor: Salil Kumar Jain, Jackson Heights, NY (US)

(73) Assignee: Aetna Inc., Hartford, CT (US)

( * ) Notice: Subject to any disclaimer, the term of this patent is extended or adjusted under 35 U.S.C. 154(b) by 109 days.

(21) Appl. No.: 15/423,089

(22) Filed: Feb. 2, 2017

(65) Prior Publication Data

US 2018/0219891 A1 Aug. 2, 2018

(51) Int. Cl.
H04L 29/06 (2006.01)

(52) U.S. Cl.
CPC ...... H04L 63/1433 (2013.01); H04L 63/0272 (2013.01); H04L 63/1425 (2013.01)

(58) Field of Classification Search
CPC ............. H04L 63/1425; H04L 63/0272; H04L 63/1433
See application file for complete search history.

(56) References Cited

U.S. PATENT DOCUMENTS

| | | | | | |
|---|---|---|---|---|---|
| 8,745,698 | B1* | 6/2014 | Ashfield | ................. | H04L 63/08 726/4 |
| 8,856,894 | B1* | 10/2014 | Dean | ...................... | H04L 63/08 713/175 |
| 9,405,897 | B1* | 8/2016 | Bailey | ..................... | G06F 21/44 |
| 9,514,293 | B1* | 12/2016 | Moritz | .................. | G06F 21/316 |
| 9,722,996 | B1* | 8/2017 | Kolman | ................ | H04L 63/083 |
| 2007/0238065 | A1* | 10/2007 | Sherwood | ................ | A61C 7/00 433/24 |
| 2010/0169192 | A1* | 7/2010 | Zoldi | ..................... | G06Q 40/00 705/30 |
| 2011/0314558 | A1* | 12/2011 | Song | ..................... | G06F 21/316 726/28 |
| 2012/0166285 | A1* | 6/2012 | Shapiro | .............. | G06Q 30/0251 705/14.58 |
| 2013/0097701 | A1* | 4/2013 | Moyle | ................... | G06F 21/552 726/22 |
| 2014/0208419 | A1* | 7/2014 | Chang | .................... | G06F 21/31 726/21 |
| 2014/0351109 | A1* | 11/2014 | Peng | ...................... | G06Q 40/00 705/35 |
| 2016/0063229 | A1* | 3/2016 | Key | ....................... | G06F 21/316 726/1 |
| 2016/0314635 | A1* | 10/2016 | Chen | .................. | G07C 9/00896 |
| 2017/0046510 | A1* | 2/2017 | Chen | ..................... | G06F 21/552 |

(Continued)

Primary Examiner — Michael Pyzocha
(74) Attorney, Agent, or Firm — Leydig, Voit & Mayer, Ltd.

(57) ABSTRACT

A method for assessing and responding to potential cybersecurity risks includes: obtaining, by a computing device, a plurality of attributes relating to an authentication event; determining, by the computing device, based on a cybersecurity risk assessment model, whether the plurality of attributes relating to the authentication event indicate a potential cybersecurity risk, wherein the cybersecurity risk assessment model is individualized on a per-user or per-device basis; and causing, by the computing device, in response to determining that the determined plurality of attributes relating to the authentication event indicate a potential cybersecurity risk, a heightened security measure to be implemented.

18 Claims, 6 Drawing Sheets

(56) References Cited

U.S. PATENT DOCUMENTS

| | | | | |
|---|---|---|---|---|
| 2017/0180339 A1* | 6/2017 | Cheng | ............ | H04L 63/08 |
| 2017/0289134 A1* | 10/2017 | Bradley | ............ | G06F 17/30283 |
| 2017/0300911 A1* | 10/2017 | Alnajem | ............ | G06Q 20/4014 |
| 2018/0041518 A1* | 2/2018 | Jacobs | ............ | H04L 63/0876 |
| 2018/0069896 A1* | 3/2018 | Urmanov | ............ | H04L 63/1483 |
| 2018/0152471 A1* | 5/2018 | Jakobsson | ............ | G06Q 50/01 |
| 2018/0204215 A1* | 7/2018 | Hu | ............ | G06Q 20/401 |
| 2018/0308160 A1* | 10/2018 | Liu | ............ | G06F 19/00 |

\* cited by examiner

INDIVIDUALIZED CYBERSECURITY RISK DETECTION USING MULTIPLE ATTRIBUTES

BACKGROUND

With the proliferation of computing devices and networked environments, there are now a multitude of ways in which the device users' sensitive information may be obtained in an unauthorized manner. There have thus been many security measures that have been developed to prevent or impede such unauthorized access to sensitive information.

One of these security measures is to use cybersecurity risk indicators to determine whether unauthorized activity may be taking place, and in response to detecting a relatively high level of cybersecurity risk, a heightened level of security may be required. For example, if a user's credentials or a user's token is being used to log-in to a website or application from a new location or new computing device, such circumstances may indicate that the user's credentials have been compromised, and it may be that an unauthorized user has illegitimately obtained the user's credentials or token. Thus, in such circumstances, the website or application may require a heightened degree of security, such as re-entry of certain credentials or the answering of security questions.

SUMMARY

In an exemplary embodiment, the invention provides a method for assessing and responding to potential cybersecurity risks. The method includes: obtaining, by a computing device, a plurality of attributes relating to an authentication event; determining, by the computing device, based on a cybersecurity risk assessment model, whether the plurality of attributes relating to the authentication event indicate a potential cybersecurity risk, wherein the cybersecurity risk assessment model is individualized on a per-user or per-device basis; and causing, by the computing device, in response to determining that the determined plurality of attributes relating to the authentication event indicate a potential cybersecurity risk, a heightened security measure to be implemented.

In another exemplary embodiment, the invention provides a non-transitory, computer-readable medium having processor-executable instructions stored thereon for assessing and responding to potential cybersecurity risks. The processor-executable instructions, when executed, facilitate performance of the following: obtaining a plurality of attributes relating to an authentication event; determining, based on a cybersecurity risk assessment model, whether the plurality of attributes relating to the authentication event indicate a potential cybersecurity risk, wherein the cybersecurity risk assessment model is individualized on a per-user or per-device basis; and causing, in response to determining that the determined plurality of attributes relating to the authentication event indicate a potential cybersecurity risk, a heightened security measure to be implemented.

In yet another exemplary embodiment, the invention provides a system for assessing and responding to potential cybersecurity risks. The system includes: a user device, wherein the user device is configured to attempt an authentication event and detect a plurality of attributes relating to the authentication event; and a server, wherein the server is configured to: obtain the plurality of attributes relating to the authentication event attempted by the user device; determine, based on a cybersecurity risk assessment model, whether the plurality of attributes relating to the authentication event indicate a potential cybersecurity risk, wherein the cybersecurity risk assessment model is individualized on a per-user or per-device basis; and cause, in response to determining that the determined plurality of attributes relating to the authentication event indicate a potential cybersecurity risk, a heightened security measure to be implemented.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Exemplary embodiments of the invention provide for analysis of multiple attributes to assess cybersecurity risks associated with device loss, lack of rightful possession, and identity theft. Unlike conventional approaches which use global rules that are applied across all users and/or devices, exemplary embodiments of the invention utilize device-specific or user-specific rules that are individualized for a device or user based on multiple attributes.

For example, in a conventional system, a global rule may be employed to identify cybersecurity risk based on a difference between a current network Service Set Identifier (SSID) being accessed by the device and previously known SSIDs that have been accessed by the device. If the present device location corresponds to a new device location for any device, the existence of a cybersecurity risk may be identified and a heightened security measure may be applied. Such a conventional system may be susceptible to attacks such as a man-in-the-middle (MITM) Karma attack, which tricks a victim device to automatically connect to a malicious Wi-Fi access point by spoofing Wi-Fi networks known to the victim device.

Exemplary embodiments of the invention, however, by using multiple attributes, such as a combination of device location and network SSID, are able to protect against such MITM Karma attacks by checking not only network SSID, but also one or more other attributes. For example, if the network SSID of an available Wi-Fi access point matches a previously known Wi-Fi access point, but the device location is different from previous device locations at which the previously known Wi-Fi access point was accessed, the circumstances indicate that the device may be undergoing an MITM Karma attack, and enhanced security measures may be implemented.

Other examples of attributes that may be used include the presence of other devices in the vicinity (e.g., identifying whether other Bluetooth devices in proximity to a device are the same as Bluetooth devices that have previously been in proximity to the device), network services available through the network (e.g., using Bonjour to identify available services and seeing if the available services for the network match the available services for the network in the past), and the Internet Protocol (IP) address corresponding to a device (e.g., checking whether an IP of a device providing a token or credentials matches an IP of a device that has previously provided the token or credentials).

Further, exemplary embodiments of the invention may utilize machine-learning techniques (such as support vector machine (SVM), neural networks, clustering, etc.) to develop individualized models of cybersecurity risk assessment for a user or a device. By specifically tailoring a cybersecurity risk assessment model for a particular user or device, an individualized and improved user experience may be provided where unnecessary heightened security measures caused by the application of single-attribute global rules are avoided. Further, by deploying the cybersecurity risk assessment model based on multiple attributes instead of a single attribute, exemplary embodiments of the invention are able to identify security threats that may go undetected by systems utilizing single-attribute global rules.

Figure 1:
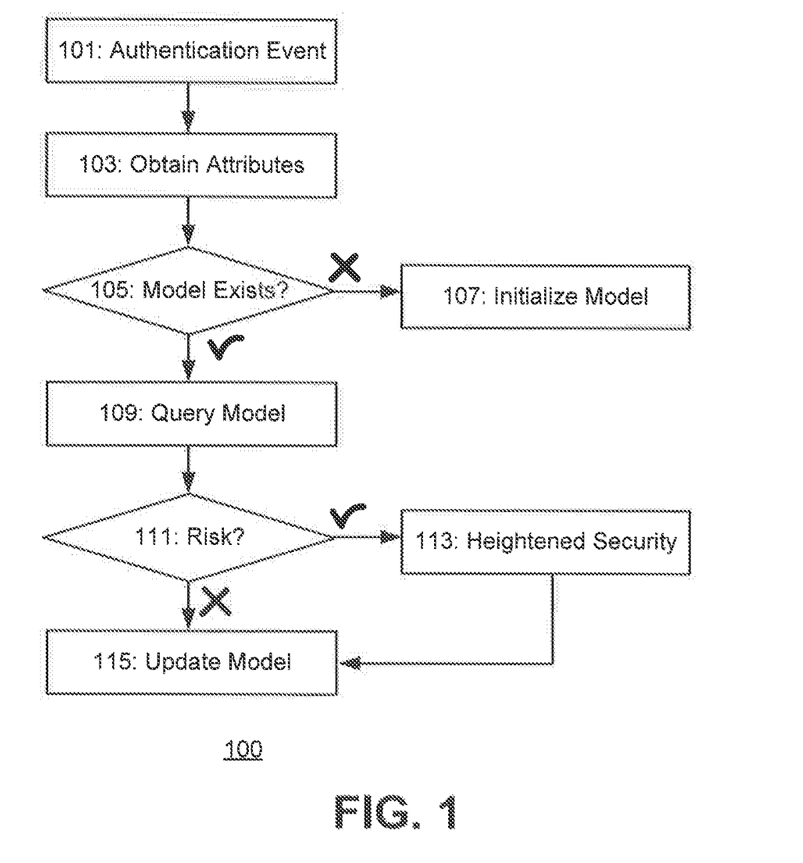
FIG. 1 depicts an exemplary process for initializing and using an individualized cybersecurity risk assessment model for a user or device.

FIG. 1 depicts an exemplary process for initializing and using an individualized cybersecurity risk assessment model for a user or device. At stage 101, an authentication event takes place. The authentication event may be, for example, a log-in attempt via an application (e.g., via a mobile app, software application, or a web browser) on a computing device (e.g., a smartphone, tablet, laptop, desktop, or other computing device) using an authentication token or user credentials (such as a log-in name and a password). The log-in attempt may be locally processed by the computing device or communicated to another computing device (e.g., a server) for processing by the other computing device. In another example, the authentication event may be an attempt to connect to a network, such as attempting to connect to a Wi-Fi network through a Wi-Fi access point.

At stage 103, attributes corresponding to the authentication event are determined. These attributes may include, for example, a device location, an IP address, a network identifier (e.g., a network SSID), presence of other devices in the vicinity, and available network services. These attributes may be determined locally (e.g., detected using information and/or sensors available to a device itself) and securely sent to a server for risk assessment processing.

If a model does not exist for a user or device corresponding to the authentication event (stage 105), the model is initialized at stage 107. Initialization of the model at stage 107 utilizes a successful authentication event (which may require a heightened security measure as discussed below with respect to stage 113), or multiple successful authentication events, to begin the construction of a user-specific or device-specific cybersecurity risk assessment model. In an exemplary implementation where the model is based on a clustering approach, initializing the model utilizes the attributes corresponding to the successful authentication event to create a K=1 cluster with radius R.

If a model exists for the user or device corresponding to the authentication event (stage 105), the model is queried at stage 109 to determine whether the detected attributes correspond to a potential cybersecurity risk (stage 111). For example, determining whether the detected attributes correspond to a potential cybersecurity risk may include determining whether the detected attributes are within a predetermined threshold range of previously detected attributes input into the model. In an exemplary implementation where the model is based on a clustering approach, querying the model at stage 109 corresponds to determining whether the detected attributes at stage 103 are within any cluster of radius R (e.g., determining whether the detected attributes are within a predetermined distance from a center of an existing cluster), and if so, determining that there is not a sufficiently high potential cybersecurity risk to warrant heightened security measures (stage 111) or if not, determining that there is a sufficiently high potential cybersecurity risk to warrant heightened security measures (stage 111).

If, based on the querying of the model at stage 109, there is a sufficiently high potential cybersecurity risk (stage 111), a heightened security measure is applied at stage 113. The heightened security measure may include, for example, re-entry of certain credentials, presentation of a security token, a two-step verification process through e-mail or text message, the answering of security questions, biometric verification, or declining to extend the expiration of a temporary authentication token. For a heightened security measure to which a response is required, and assuming that the user or device successfully presents a valid response, the authentication event 101 is successful, and the model may be updated at stage 115 based on the detected attributes at stage 103 being determined to be acceptable. In an exemplary implementation where the model is based on a clustering approach, the detected attributes at stage 103 determined as acceptable may be used to create a K+1 cluster with radius R.

If, based on the querying of the model at stage 109, there is not a sufficiently high potential cybersecurity risk to warrant heightened security measures (stage 111), the authentication event is successful without a heightened security measure being required, and the model may be updated at stage 115 based on the detected attributes at stage 103 being determined to be acceptable. In an exemplary implementation where the model is based on a clustering approach, the detected attributes at stage 103 determined as acceptable may be used to update an existing cluster to which the detected attributes correspond (e.g., by adjusting the center of an existing cluster to account for the detected attributes).

It will be appreciated that different computing devices may perform the different stages of the process shown in FIG. 1 in different situations (e.g., depending on the type of authentication event and the type of cybersecurity risk being detected).

Figure 2A:
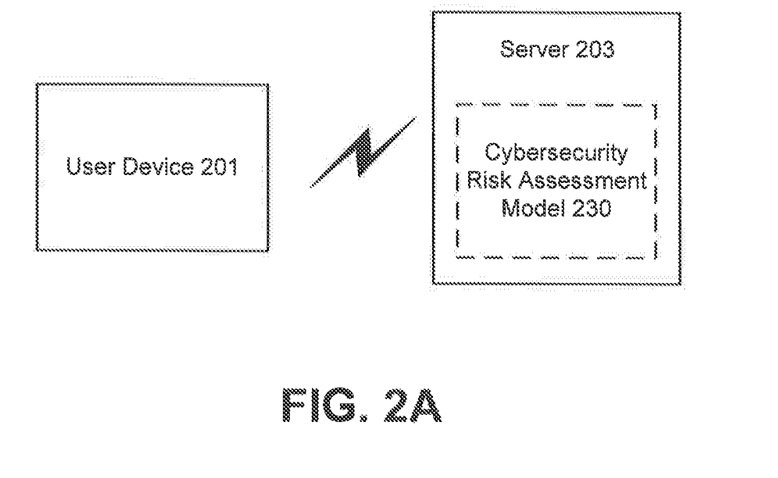
FIG. 2A depicts an exemplary embodiment where a server performs cybersecurity risk assessment with respect to a user device.

FIG. 2A depicts an exemplary embodiment where a server performs cybersecurity risk assessment with respect to a user device. For example, if a user device 201 (e.g., a mobile device or a personal computer) is stolen or lost, or if the user device 201 is an unauthorized user device (e.g., an unauthorized user device that has maliciously obtained credentials from an authorized user through malware or otherwise), and an unauthorized user is attempting to use an authentication token or user credentials for authentication relative to a server 203, the server 203 obtains relevant attributes from the user device 201 corresponding to the authentication event and determines whether heightened security measures are appropriate based on application of an individualized cybersecurity risk assessment model 230. If the use of the user device 201 is determined by the server 203 as being potentially unauthorized (e.g., the obtained attributes being associated with a risk score above a certain threshold or not falling within any trusted cluster), the server 203 may implement heightened security measures such as requiring additional authentication information (e.g., via a two-step authentication process or via re-entry of credentials) or denying the authentication attempt by the user device 201.

Figure 2B:
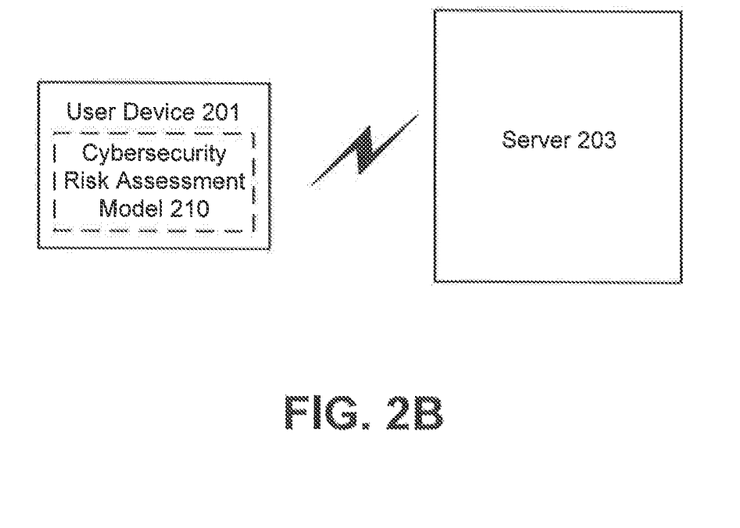
FIG. 2B depicts an exemplary embodiment where a user device itself performs cybersecurity risk assessment.

FIG. 2B depicts an exemplary embodiment where a user device itself performs cybersecurity risk assessment. For example, if a user device 201 (e.g., a mobile device or a personal computer) is stolen or lost, and an unauthorized user is attempting to use an authentication token or user credentials for authentication relative to a server 205, an application running on the user device 201 itself obtains attributes relating to the user device 201 corresponding to the authentication event and determines whether heightened security measures are appropriate based on the application utilizing an individualized cybersecurity risk assessment model 210. If the use of the user device 201 is determined by the application as being potentially unauthorized (e.g., the obtained attributes being associated with a risk score above a certain threshold or not falling within any trusted cluster), the user device 201 may implement heightened security measures such as requiring additional authentication information (e.g., via a two-step authentication process or via re-entry of credentials) or denying the authentication attempt by the user device 201.

Figure 2C:
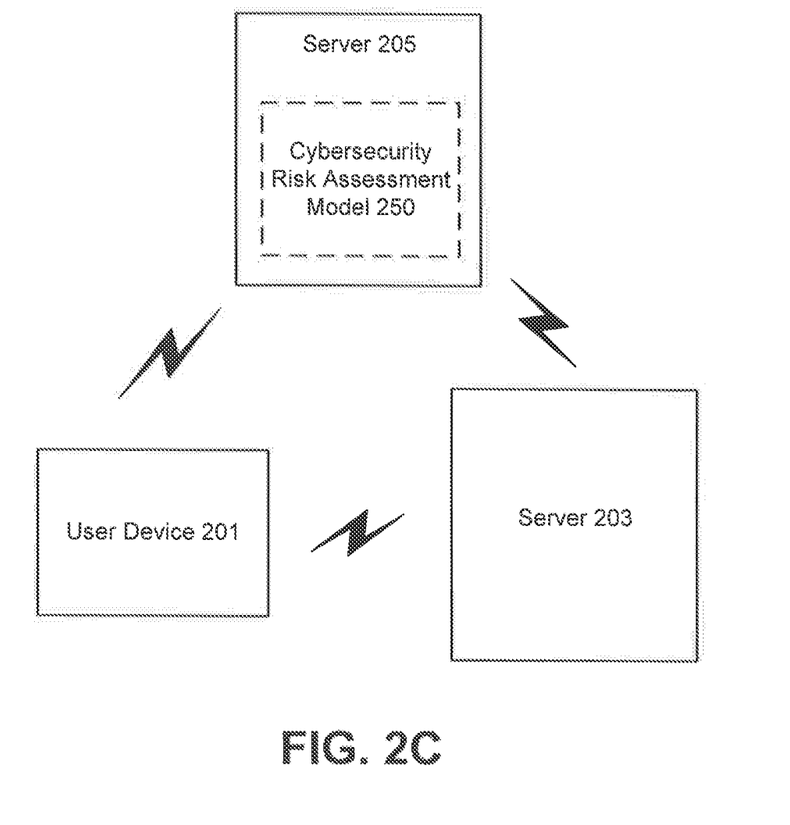
FIG. 2C depicts an exemplary embodiment where a server performs cybersecurity risk assessment with respect to a user device.

FIG. 2C depicts an exemplary embodiment where a server performs cybersecurity risk assessment with respect to a user device. For example, if a user device 201 (e.g., a mobile device or a personal computer) is stolen or lost, or if the user device 201 is an unauthorized user device (e.g., an unauthorized user device that has maliciously obtained credentials from an authorized user through malware or otherwise), and an unauthorized user is attempting to use an authentication token or user credentials for authentication relative to a server 203, another server 205 obtains, from the user device 201 or from the server 203, relevant attributes relating to the user device 201 corresponding to the authentication event and determines whether heightened security measures are appropriate based on application of an individualized cybersecurity risk assessment model 250. If the use of the user device 201 is determined, by the server 205 as being potentially unauthorized (e.g., the obtained attributes being associated with a risk score above a certain threshold or not falling within any trusted cluster), the server 205 may provide a notification or instruction to the user device 201 or to the server 203 to implement heightened security measures such as requiring additional authentication information (e.g., via a two-step authentication process or via re-entry of credentials) or denying the authentication attempt by the user device 201.

Figure 3A:
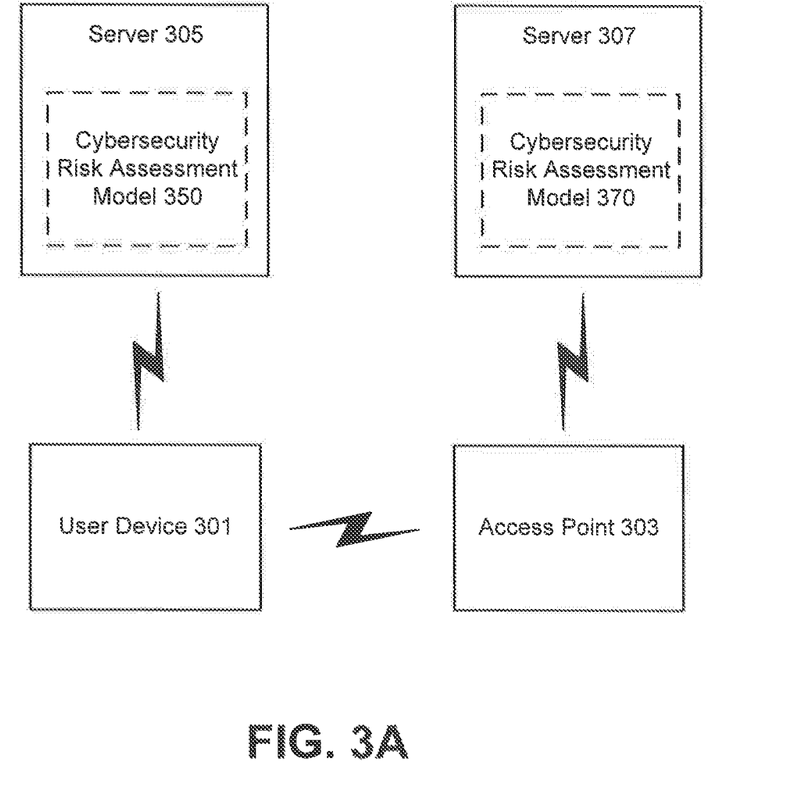
FIGS. 3A-3B depict exemplary embodiments where a user device and a network access point perform cybersecurity risk assessment with respect to one another.
Figure 3B:
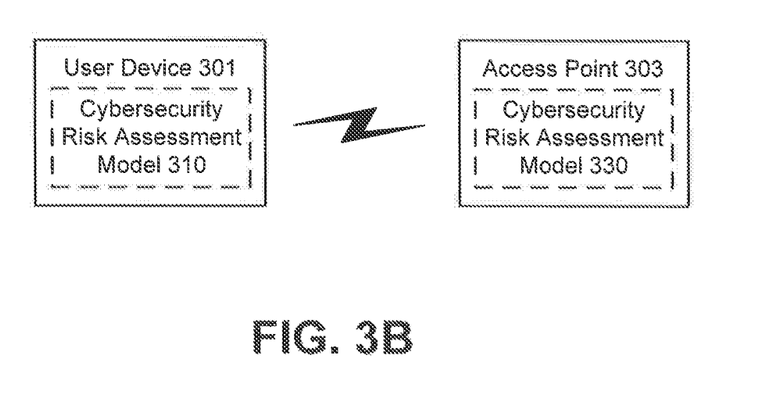

FIGS. 3A-3B depict exemplary embodiments where a user device and a network access point perform cybersecurity risk assessment with respect to one another. When a user device 301 (e.g., a mobile device or a personal computer) attempts to connect to a network (e.g., a Wi-Fi network) via an access point 303 (e.g., a Wi-Fi access point), both the access point 303 and the user device 301 may attempt to verify the integrity and/or identity of the other and respectively determine whether heightened security measures are appropriate. By doing so, the user device 301 is able to avoid connections to potentially malicious access points, and the access point 303 is able to avoid connections from user devices that are potentially being operated in an unauthorized way (such as in the case of a stolen or lost user device being operated by an unauthorized user)

In FIG. 3A, the user device 301 may obtain attribute information relating to the access point 303 or corresponding network, and sends the attribute information to a server 305 for cybersecurity risk assessment based on a cybersecurity risk assessment model 350 that is applicable to identifying potentially malicious access points or networks. If the access point 303 or corresponding network is determined by the server 305 as being potentially malicious (e.g., being associated with a risk score above a certain threshold or having attributes that are not part of any trusted cluster), the server 305 may notify the user device 301 and the user device 301 may implement heightened security measures (such as notifying a user of the user device 301 that the access point or network is potentially malicious and/or requesting additional authentication information from the access point 303 and/or preventing the user device 301 from connecting to the access point 303).

Also depicted in FIG. 3A, the access point 303 may obtain attribute information relating to the user device 301 and send the attribute information to a server 307 for cybersecurity risk assessment based on a cybersecurity risk assessment model 370 that is applicable to identifying potentially malicious user devices. If the user device 301 is determined by the server 307 as being potentially malicious (e.g., being associated with a risk score above a certain threshold or having attributes that are not part of any trusted cluster), the server 307 may notify the access point 303 and the access point 303 may implement heightened security measures (such as requesting additional authentication information from the user device 301 and/or preventing the user device 301 from connecting to the access point 303).

It will be appreciated that although server 305 and server 307 are depicted in the exemplary embodiment of FIG. 3A as being separate servers, in other exemplary embodiments, the same server may be used for performing the operations described above with respect to both servers.

In FIG. 3B, the user device 301 may obtain attribute information relating to the access point 303 or corresponding network, and utilize a cybersecurity risk assessment model 310 that is applicable to identifying potentially malicious access points or networks. If the access point 303 or corresponding network is determined as being potentially malicious (e.g., being associated with a risk score above a certain threshold or having attributes that are not part of any trusted cluster), the user device 301 may implement heightened security measures (such as notifying a user of the user device 301 that the access point or network is potentially malicious and/or requesting additional authentication information from the access point 303 and/or preventing connection to the access point 303).

Also depicted in FIG. 3B, the access point 303 may obtain attribute information relating to the user device 301 and utilize a cybersecurity risk assessment model 330 that is applicable to identifying potentially malicious user devices. If the user device 301 is determined as being potentially malicious (e.g., being associated with a risk score above a certain threshold or having attributes that are not part of any trusted cluster), the access point 303 may implement heightened security measures (such as requesting additional authentication information from the user device 301 and/or preventing the user device 301 from connecting to the access point 303).

As discussed above, FIGS. 2A-2C and FIGS. 3A-3B depict exemplary situations in which embodiments of the invention may be used to provide for cybersecurity risk detection in an efficient and individualized manner. It will be appreciated that these figures and their corresponding descriptions are merely exemplary, and that the invention is not limited to these exemplary situations.

It will further be appreciated by those of skill in the art that the execution of the various machine-implemented processes and steps described herein may occur via the computerized execution of processor-executable instructions stored on a non-transitory computer-readable medium, e.g., random access memory (RAM), read-only memory (ROM), programmable read-only memory (PROM), volatile, nonvolatile, or other electronic memory mechanism. Thus, for example, the operations described herein as being performed by computing devices and/or components thereof may be carried out by according to processor-executable instructions and/or installed applications corresponding to software, firmware, and/or computer hardware.

The following description sets forth a first example of a cybersecurity risk assessment model based on a clustering approach with attributes being clustered together based on a distance measure. Each cluster starts empty and is updated with input attributes. If more updates are made, the center of the cluster shifts to account for updates. Updates to a pre-existing cluster are made only if input attributes are within a certain distance R from the center of the cluster, where R is a multi-dimensional vector and may have the same dimensions as center of the cluster. An example of a center of a cluster based on device location (in Global Positioning System (GPS) coordinates), network IDs, proximate devices, and available network services, is as follows:

center={−49.45843, 76.12341, [Wifi_1, Wifi_2, Wifi_3], [BluetoothDevice_1, BluetoothDevice_2], [BonjourService_1, BonjourService_2, BonjourService_3]}

The first two dimensions are for latitude and longitude, while the next three dimensions are for Wi-Fi network IDs, proximate Bluetooth devices, and Bonjour services.
An example of the distance R is as follows:

R={0.005, 0.005, 1, 1, 2}

The first two dimensions of R correspond to a difference of 0.005 being acceptable in latitude and longitude to qualify for the cluster, while the last three dimensions of R correspond to a requirement that at least one Wi-Fi network, one Bluetooth device and two Bonjour services match to qualify for this cluster.
Four exemplary sets of detected attributes corresponding to authentication events are provided as follows:

Input_1={−49.54307, 76.12523, [Wifi_1], [BluetoothDevice_1], [BonjourService_1]}
Input_2={−49.54307, 76.12523, [Wifi_2], [BluetoothDevice_1, BluetoothDevice_3], [BonjourService_1, BonjourService_2]}
Input_3={−49.54307, 76.12523, [Wifi_3], [BluetoothDevice_3], [BonjourService_1]}
Input 0.4={−49.54307, 76.12523, [Wifi_1], [BluetoothDevice_3], [BonjourService_1]}

Thus, based on the exemplary center and radius R for the cluster given above, it can be seen that Input_2 qualifies for the cluster, but Input_1, Input_3, and Input_4 do not qualify for this cluster. Input_2 may thus be used to update the center of the cluster to the following:

center={(−49.45843*[number of attributes−1]+−49.54307)/[number of attributes], (76.12341*[number of attributes−1]+76.12523)/[number of attributes], [Wifi_1, Wifi_2, Wifi_3], [BluetoothDevice_1, BluetoothDevice_2, BluetoothDevice_3], [BonjourService_1, BonjourService_2, BonjourService_3]}

After the cluster has been updated using Input_2, a subsequent detection of the attributes corresponding to Input_3 would be able to belong to this cluster. However, Input_3 may also have previously been used to start its own cluster such that there is overlap between the cluster corresponding to Input_3 and the updated cluster to which Input_2 belongs. It will be appreciated that overlap between clusters is acceptable, as regardless of which cluster to which a detected set of attributes belongs, the detected set of attributes will be determined as being acceptable such that heightened security measures are not required.

Although this first exemplary implementation describes a clustering technique, it will be appreciated that in other exemplary implementations, support vector clustering (SVC) or self-organizing maps (SOM) may be utilized in a similar manner to achieve similar results.

The following description sets forth a second example of a cybersecurity risk assessment model based on a clustering approach with attributes being clustered together based on a distance measure. In this example, there are two users, User A and User B, and the same cybersecurity risk assessment modeling techniques are applied to each user with different resulting models for each user. This is because each user has different detected attributes associated therewith there are input into their respective cybersecurity risk assessment models.

Four exemplary sets of detected attributes corresponding to authentication events for User A are provided as follows:

UserA_Input_1={Lat1, Long1, [Wifi_1], [BluetoothDevice_1], [BonjourService_1]}
UserA_Input_2={Lat2, Long2, [Wifi_2], [BluetoothDevice_1, BluetoothDevice_3], [BonjourService_1, BonjourService_2]}
UserA_Input_3 {Lat3, Long3, [Wifi_3], [BluetoothDevice_3], [BonjourService_1]}
UserA_Input_4={Lat4, Long4, [Wifi_1], [BluetoothDevice_3], [BonjourService_1]}

Assuming the attributes of these four inputs are close enough to grouped into the same cluster, a cluster corresponding to these four inputs for User A will have a center as follows:

UserA_center={(Lat1+Lat2+Lat3+Lat4)/4, (Long1+Long2+Long3+Long4)/4, [Wifi_1, Wifi_2, Wifi_3], [BluetoothDevice_1, BluetoothDevice_3], [BonjourService_1, BonjourService_2]}

Four exemplary sets of detected attributes corresponding to authentication events for User B are provided as follows:

UserB_Input_1={Lat1, Long1, [Wifi_4], [BluetoothDevice_4], [BonjourService_3]}
UserB_Input_2={Lat2, Long2, [Wifi_5], [BluetoothDevice_5, BluetoothDevice_4], [BonjourService_3]}
UserB_Input_3={Lat3, Long3, [Wifi_4], [BluetoothDevice_4], [BonjourScrvice_3]}
UserB_Input_4={Lat4, Long4, [Wifi_5], [BluetoothDevice_4], [BonjourService_3]}

Assuming the attributes of these four inputs are close enough to grouped into the same cluster, a cluster corresponding to these four inputs for User B will have a center as follows:

UserB_center={(Lat1+Lat2+Lat3+Lat4)/4, (Long1+Long2+Long3+Long4)/4, [Wifi_4, Wifi_5], [BluetoothDevice_5, BluetoothDevice_4], [BonjourService_3, BonjourService_4]}

In this example, User A and User B may be living in the same apartment building, which accounts for the similar latitude and longitude attributes for the two users while having differing attributes for network SSID, proximate device, and available services. In a situation where User B may be visiting User A's home and attempts to connect to an access point in User A's home, a set of attributes corresponding to this authentication event may be as follows:

UserB_Input_5={Lat4, Long4, [Wifi_1], [BluetoothDevice_3], [BonjourService_1]}

Due to the differing attributes for network SSID, proximate device, and available services, this authentication event may not fall within a radius R of the cluster corresponding to the UserB_center given above. Accordingly, User B may be prompted for authentication by a server or device under these circumstances, even though User A would not be prompted for authentication by such server or device under the same circumstances.

A detected set of attributes corresponding to an authentication event may be configured in a variety of different ways in different embodiments. For example, the cybersecurity risk assessment model may be set up such that each type of attribute (e.g., latitude, longitude, network SSID, proximate devices, and available services) are considered separately in the distance determination, and that a matching criteria is applied individually to each type of attribute (e.g., in a clustering approach, defining a cluster center with separate dimensions for each attribute and using a radius R that has a separate value for each of the attributes). In another example, the cybersecurity risk assessment model may be set up with non-linear dependencies between different attributes such that certain attributes are combined in the distance determination, with a matching criteria being applied to the combined attributes (e.g., in a clustering approach, defining a cluster center with certain dimensions corresponding to a combination of attributes and using a radius R that has a value for the combination; for instance, network SSID and available services attributes may be combined such that if a detected set of attributes corresponding to an authentication event has available services "BonjourService_1" and "BonjourService_2" on network SSID "Wifi_1", the network SSID attribute is concatenated with the available services attributes such that [Wifi_1_BonjourService_1, Wifi_1_BonjourService_2] may be used as one dimension for the detected set of attributes, which is compared with a cluster center that includes a similarly formatted dimension).

A non-exhaustive list of attributes that may be used in exemplary embodiments of the invention includes: malware detection; jailbreak/root detection; debugger detection (detecting if a debug session is attached to the application); location reading, accelerometer readings; gyroscope readings; compass readings; user navigation patterns; user swipe pattern; application tamper detection; device identifier (both software and/or hardware); an International Mobile Equipment Identity (IMEI), device hardware details (central processing unit (CPU), RAM, graphics processing unit (GPU), etc.); a device certificate (either granted by an authentication server or provided by the device); a date and time; device software details (operating system (OS) version, installed applications, etc.); personal identification number (PIN) or password or biometric protection on the device; a device token (hardware and/or software); a network ID (such as a Wi-Fi network ID or SSID); services available on a network; proximate devices; whether a device is plugged in; network proxy detection; and virtual private network (VPN) detection. It will be appreciated that the number and types of attributes are not intended to be limited to any specific examples or combinations, and it will be appreciated that some attributes may be transformed into a different format (e.g., from a character string to a number) for ingestion into the risk assessment model (e.g., for processing according to a clustering technique or other machine-learning technique).

Certain attributes may also relate to user behavior such as usage patterns, swipe patterns, etc., and obtaining attributes corresponding to abnormal user behavior (e.g., detected behavior differing from previous behavior by an authorized user) may indicate that an unauthorized user is using a user device even when other attributes (such as location and network ID) do not indicate a concern.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for assessing and responding to potential cybersecurity risks, comprising:
    obtaining, by a computing device, a plurality of attributes relating to an authentication event;
    determining, by the computing device, based on a cybersecurity risk assessment model, whether the plurality of attributes relating to the authentication event indicate a potential cybersecurity risk, wherein the cybersecurity risk assessment model is individualized on a per-user or per-device basis, and wherein determining whether the plurality of attributes relating to the authentication event indicate a potential cybersecurity risk further comprises:
  comparing the plurality of attributes to a cluster center and determining whether the plurality of attributes is within a radius R of the cluster center, wherein the radius R has multiple parts and the multiple parts have multiple formats, each part having a respective format corresponding to one or more of the plurality of attributes;
  causing, by the computing device, in response to determining that the determined plurality of attributes relating to the authentication event indicate a potential cybersecurity risk, a heightened security measure to be implemented; and
  in response to the heightened security measure being passed, updating, by the computing device, the cybersecurity risk model by adding a new cluster to the cybersecurity risk model based on the plurality of attributes relating to the authentication event.

2. The method according to claim 1, wherein the cybersecurity risk assessment model is individualized based on initializing and updating of the cybersecurity risk assessment model for a particular user or device.

3. The method according to claim 2, wherein initializing and updating the cybersecurity risk assessment model comprises:
  initializing the cybersecurity risk assessment model based on one or more sets of attributes corresponding to one or more successful authentication events; and
  updating the cybersecurity risk assessment model based on one or more sets of attributes corresponding to one or more subsequent successful authentication events after the cybersecurity risk assessment model has been initialized.

4. The method according to claim 3, wherein initializing the cybersecurity risk assessment model further comprises creating one or more clusters based on the one or more sets of attributes corresponding to one or more successful authentication events; and
  wherein updating the cybersecurity risk assessment model further comprises creating or updating one or more clusters based on the one or more sets of attributes corresponding to one or more subsequent successful authentication events.

5. The method according to claim 1, wherein the plurality of attributes comprise one or more attribute types of the following attribute types: a malware detection attribute; a jailbreak/root detection attribute; a debugger detection attribute; a location attribute; an accelerometer attribute; a gyroscope attribute; a compass attribute; a user navigation pattern attribute; a user swipe pattern attribute; an application tamper detection attribute; a device identifier attribute; an International Mobile Equipment Identity (IMEI) attribute; a device hardware attribute; a device certificate attribute; a date and/or time attribute; a device software attribute; a personal identification number (PIN) and/or password and/or biometric protection attribute; a device token attribute; a network identification attribute; a network services attribute; a proximate devices attribute; an attribute corresponding to whether a device is plugged in; a network proxy detection attribute; and a virtual private network (VPN) detection attribute.

6. The method according to claim 1, wherein the plurality of attributes relating to the authentication event comprises an identification of one or more devices paired or available to be paired to a user device being authenticated, and wherein comparing the plurality of attributes to the cluster center comprises comparing the identification of the one or more devices paired or available to be paired to the user device being authenticated to one or more previous identifications of one or more devices paired or available to be paired to the user device.

7. The method according to claim 1, wherein the plurality of attributes relating to the authentication event comprises an identification of one or more network services available to a user device being authenticated, and wherein comparing the plurality of attributes to the cluster center comprises comparing the identification of the one or more network services available to the user device being authenticated to one or more previous identifications of one or more network services available to a user device.

8. A non-transitory, computer-readable medium having processor-executable instructions stored thereon for assessing and responding to potential cybersecurity risks, the processor-executable instructions, when executed, facilitating performance of the following:
  obtaining a plurality of attributes relating to an authentication event;
  determining, based on a cybersecurity risk assessment model, whether the plurality of attributes relating to the authentication event indicate a potential cybersecurity risk, wherein the cybersecurity risk assessment model is individualized on a per-user or per-device basis, and wherein determining whether the plurality of attributes relating to the authentication event indicate a potential cybersecurity risk further comprises:
    comparing the plurality of attributes to a cluster center and determining whether the plurality of attributes is within a radius R of the cluster center, wherein the radius R has multiple parts and the multiple parts have multiple formats, each part having a respective format corresponding to one or more of the plurality of attributes;
  causing, in response to determining that the determined plurality of attributes relating to the authentication event indicate a potential cybersecurity risk, a heightened security measure to be implemented; and
  in response to the heightened security measure being passed, updating the cybersecurity risk model by adding a new cluster to the cybersecurity risk model based on the plurality of attributes relating to the authentication event.

9. The non-transitory, computer-readable medium according to claim 8, wherein the cybersecurity risk assessment model is individualized based on initializing and updating of the cybersecurity risk assessment model for a particular user or device.

10. The non-transitory, computer-readable medium according to claim 9, wherein initializing and updating the cybersecurity risk assessment model comprises:
  initializing the cybersecurity risk assessment model based on one or more sets of attributes corresponding to one or more successful authentication events; and
  updating the cybersecurity risk assessment model based on one or more sets of attributes corresponding to one or more subsequent successful authentication events after the cybersecurity risk assessment model has been initialized.

11. The non-transitory, computer-readable medium according to claim 10, wherein initializing the cybersecurity risk assessment model further comprises creating one or more clusters based on the one or more sets of attributes corresponding to one or more successful authentication events; and wherein updating the cybersecurity risk assessment model further comprises creating or updating one or more clusters based on the one or more sets of attributes corresponding to one or more subsequent successful authentication events.

12. The non-transitory, computer-readable medium according to claim 8, wherein the plurality of attributes comprise one or more attribute types of the following attribute types: a malware detection attribute; a jailbreak/root detection attribute; a debugger detection attribute; a location attribute; an accelerometer attribute; a gyroscope attribute; a compass attribute; a user navigation pattern attribute; a user swipe pattern attribute; an application tamper detection attribute; a device identifier attribute; an International Mobile Equipment Identity (IMEI) attribute; a device hardware attribute; a device certificate attribute; a date and/or time attribute; a device software attribute; a personal identification number (PIN) and/or password and/or biometric protection attribute; a device token attribute; a network identification attribute; a network services attribute; a proximate devices attribute; an attribute corresponding to whether a device is plugged in; a network proxy detection attribute; and a virtual private network (VPN) detection attribute.

13. A system for assessing and responding to potential cybersecurity risks, comprising:
 a user device, wherein the user device is configured to attempt an authentication event and detect a plurality of attributes relating to the authentication event; and
 a server, wherein the server is configured to:
  obtain the plurality of attributes relating to the authentication event attempted by the user device;
  determine, based on a cybersecurity risk assessment model, whether the plurality of attributes relating to the authentication event indicate a potential cybersecurity risk, wherein the cybersecurity risk assessment model is individualized on a per-user or per-device basis, and wherein determining whether the plurality of attributes relating to the authentication event indicate a potential cybersecurity risk further comprises: comparing the plurality of attributes to a cluster center and determining whether the plurality of attributes is within a radius R of the cluster center, wherein the radius R has multiple parts and the multiple parts have multiple formats, each part having a respective format corresponding to one or more of the plurality of attributes;
  cause, in response to determining that the determined plurality of attributes relating to the authentication event indicate a potential cybersecurity risk, a heightened security measure to be implemented; and
  in response to the heightened security measure being passed, update the cybersecurity risk model by adding a new cluster to the cybersecurity risk model based on the plurality of attributes relating to the authentication event.

14. The system according to claim 13, wherein the cybersecurity risk assessment model is individualized based on initializing and updating of the cybersecurity risk assessment model for a particular user or device.

15. The system according to claim 14, wherein initializing and updating the cybersecurity risk assessment model comprises:
 initializing the cybersecurity risk assessment model based on one or more sets of attributes corresponding to one or more successful authentication events; and
 updating the cybersecurity risk assessment model based on one or more sets of attributes corresponding to one or more subsequent successful authentication events after the cybersecurity risk assessment model has been initialized.

16. The system according to claim 15, wherein initializing the cybersecurity risk assessment model further comprises creating one or more clusters based on the one or more sets of attributes corresponding to one or more successful authentication events; and wherein updating the cybersecurity risk assessment model further comprises creating or updating one or more clusters based on the one or more sets of attributes corresponding to one or more subsequent successful authentication events.

17. The system according to claim 13, wherein the plurality of attributes comprise one or more attribute types of the following attribute types: a malware detection attribute; a jailbreak/root detection attribute; a debugger detection attribute; a location attribute; an accelerometer attribute; a gyroscope attribute; a compass attribute; a user navigation pattern attribute; a user swipe pattern attribute; an application tamper detection attribute; a device identifier attribute; an International Mobile Equipment Identity (IMEI) attribute; a device hardware attribute; a device certificate attribute; a date and/or time attribute; a device software attribute; a personal identification number (PIN) and/or password and/or biometric protection attribute; a device token attribute; a network identification attribute; a network services attribute; a proximate devices attribute; an attribute corresponding to whether a device is plugged in; a network proxy detection attribute; and a virtual private network (VPN) detection attribute.

18. The system according to claim 13, wherein the user device is a mobile device or a personal computer.

* * * * *